United States Patent
Reith et al.

(10) Patent No.: US 11,125,351 B2
(45) Date of Patent: Sep. 21, 2021

(54) PILOT-OPERATED HYDRAULIC DIRECTIONAL CARTRIDGE VALVE

(71) Applicant: Robert Bosch GmbH, Stuttgart (DE)

(72) Inventors: Werner Reith, Eussenheim (DE); Bernd Urlaub, Steinfeld (DE); Binh Nguyen-Xuan, Partenstein (DE); Johannes Wolf, Rechtenbach (DE)

(73) Assignee: Robert Bosch GmbH, Stuttgart (DE)

( * ) Notice: Subject to any disclaimer, the term of this patent is extended or adjusted under 35 U.S.C. 154(b) by 46 days.

(21) Appl. No.: 16/443,224

(22) Filed: Jun. 17, 2019

(65) Prior Publication Data
US 2019/0390789 A1 Dec. 26, 2019

(30) Foreign Application Priority Data

Jun. 20, 2018 (DE) ...................... 10 2018 209 954.5
Jul. 17, 2018 (DE) ...................... 10 2018 211 866.3

(51) Int. Cl.
*F16K 27/04* (2006.01)
*F16K 31/12* (2006.01)
(Continued)

(52) U.S. Cl.
CPC .............. *F16K 27/041* (2013.01); *F16K 3/24* (2013.01); *F16K 3/30* (2013.01); *F16K 31/12* (2013.01)

(58) Field of Classification Search
CPC ........ F16K 27/041; F16K 27/02; F16K 31/12; F16K 31/122; F16K 3/30; F16K 3/24; F16K 11/07; F15B 13/021
See application file for complete search history.

(56) References Cited

U.S. PATENT DOCUMENTS 4,413,648 A * 11/1983 Walters ................. F15B 13/043
137/486
4,596,271 A * 6/1986 Brundage ................. F15B 9/03
137/529
(Continued)

FOREIGN PATENT DOCUMENTS

DE 195 44 592 A1 9/1996
DE 10 2008 059 058 B3 4/2010
EP 0 634 577 A1 1/1995

OTHER PUBLICATIONS

Moog, "2-Way Slip-In Cartridge Valves Directional and Pressure Function," Jun. 2013, available at www.moog.com/content/dam/moog/literature/ICD/Moog-CartridgeValves-2way_Stard-Catalog-en.pdf (56 pages).
(Continued)

*Primary Examiner* — Craig J Price
*Assistant Examiner* — Andrew J Rost
(74) *Attorney, Agent, or Firm* — Maginot, Moore & Beck LLP

(57) ABSTRACT

A pilot-operated hydraulic directional cartridge valve includes an installation sleeve and a control slide. The installation sleeve includes a bore, a first portion towards its front end face, a third portion towards its rear end face, and a second portion between the first and third portions. The first portion has a first external sealing diameter and the third portion has a second external sealing diameter greater than the first external sealing diameter. The second portion includes radial openings and possesses an external diameter greater than first external sealing diameter and smaller than the second external sealing diameter in the region of the radial openings. The control slide is guided in the axial direction on a guide diameter of the installation sleeve, behind the radial openings. The ratio between the first
(Continued)

external sealing diameter and the guide diameter is in the range between 1.10 and 1.22.

20 Claims, 4 Drawing Sheets

(51) Int. Cl.
*F16K 3/30* (2006.01)
*F16K 3/24* (2006.01)

(56) References Cited

U.S. PATENT DOCUMENTS

| | | | | |
|---|---|---|---|---|
| 6,161,585 | A * | 12/2000 | Kolchinsky | G05D 16/2024 137/625.65 |
| 6,439,257 | B1 * | 8/2002 | Bruck | G05D 16/02 137/102 |
| 6,571,828 | B2 * | 6/2003 | Harms | F15B 13/0402 137/625.61 |
| 6,598,622 | B1 * | 7/2003 | Reith | F15B 13/0402 137/625.63 |
| 7,069,675 | B2 * | 7/2006 | Nishi | E02F 9/2267 37/236 |
| 7,766,041 | B2 * | 8/2010 | Tackes | F16K 31/0613 137/625.3 |
| 9,140,375 | B2 * | 9/2015 | Feser | F16K 27/02 |
| 2008/0185047 | A1 * | 8/2008 | Eichler | F16K 17/30 137/15.19 |

OTHER PUBLICATIONS

Duplomatic, "Elementos Logicos: LC Valvulas A Cartucho ISO 7368—DIN 24342, LP Tapas Para Valvulas A Cartucho," Jul. 2006, available at www.hidraulik.com.ar/imgs/vr_logic%20elements/48900-3.pdf (24 pages).

Bosch Rexroth AG, "2- und 3-Wege-Einbauregelventil," RD 29136/12.04, Data Sheet, Dec. 2004 (German language) (24 pages).

Bosch Rexroth AG, "2- and 3-way high-response cartridge valve," RE 29136/12.04, Data Sheet, Dec. 2004 (English language equivalent to RD 29136/12.04) (24 pages).

Bosch Rexroth AG, "2- und 3-Wege-Einbauregelventil," RD 29137/08.13, Data Sheet, Aug. 2013 (German language) (24 pages).

Bosch Rexroth AG, "2- and 3-way high-response cartridge valve," RE 29137/08.13, Data Sheet, Aug. 2013 (English language equivalent to RD 29137/08.13) (24 pages).

Norm DIN ISO 7368:1994-02, 2-Wege-Einbauventile, Hydraulic fluid power; two-port slip-in cartridge valves; cavities Feb. 1994 (20 pages).

* cited by examiner

PILOT-OPERATED HYDRAULIC DIRECTIONAL CARTRIDGE VALVE

This application claims priority under 35 U.S.C. § 119 to patent application no. DE 10 2018 209 954.5, filed on Jun. 20, 2018 in Germany, and patent application no. DE 10 2018 211 866.3, filed on Jul. 17, 2018 in Germany, the disclosures of which are incorporated herein by reference in their entirety.

BACKGROUND

The disclosure relates to a pilot-operated hydraulic directional cartridge valve having an installation sleeve which is to be inserted into an installation bore of a hydraulic block and has an internal bore and which has, towards its front end face, a first sleeve portion having a first external sealing diameter and, towards its rear end face, a third sleeve portion having a second external sealing diameter which is larger than the sealing diameter in the first sleeve portion and, therebetween, a second sleeve portion in which it has a row of radial openings and in which it possesses, in the region of the radial openings and in each case over a certain length on both sides thereof, an external diameter which is larger than the first external sealing diameter and smaller than the second external sealing diameter. The directional cartridge valve moreover has a control slide which possesses a slide collar for its hydraulic actuation and which is guided in the axial direction in the internal bore of the installation sleeve and with which a flow cross-section between the internal bore and the radial openings can be controlled. The control slide is guided in the axial direction on a guide diameter, at least behind the radial openings in the installation sleeve. The internal diameter of the installation sleeve up to the region of the radial openings is at least as large as the guide diameter.

The dimensions for the installation bore into which the installation sleeve is to be inserted are standardized by DIN ISO 7368 and vary in size depending on the nominal size of the directional cartridge valve. A range of dimensions for the installation sleeve are specified thereby and cannot be altered if the standard is to be met. In particular, the diameter of the installation bore in the regions in which the first sleeve portion and the third sleeve portion of the installation sleeve are located after the insertion thereof is specified by the standard. The external sealing diameter in the first sleeve portion and the external sleeve diameter in the third sleeve portion are also specified thereby. These sealing diameters are substantially equal to the corresponding diameters of the installation bore.

The pilot-operated hydraulic directional cartridge valve having the features described above is known from the data sheet RD 29137/08.13 or the data sheet RD 29136/12.04 by Bosch Rexroth AG. The directional cartridge valve can be a 2-way or a 3-way cartridge valve, wherein the 2-way cartridge valve is usually formed as a seat valve and the 3-way cartridge valve is usually purely a slide valve.

High volume flow rates in both flow directions should be possible with such a directional cartridge valve.

SUMMARY

This is achieved in that the ratio between the first external sealing diameter and the guide diameter for the control slide is in the range between 1.10 and 1.28.

Therefore, the installation sleeve is notable for a particularly large internal diameter which enables high volume flow rates. The control slide can be made large in accordance with the large guide diameter so that, in positions of the control slide in which the valve is open, there is a large flow cross-section between the control slide and the installation sleeve. This large flow cross-section enables high volume flow rates without a no-longer acceptable drop in pressure across the valve. The external diameter of the installation sleeve in the region of the first, front sleeve portion and in the region of the third sleeve portion is specified by the standard. The two sleeve portions are usually provided externally with a circumferential annular groove into which a sealing ring is inserted. Thus, an axial working connection and a radial working connection are sealed to the outside by the first sleeve portion and the radial working connection is sealed to the outside by the third sleeve portion. Here, "front" refers to the end face of the installation sleeve which is first to enter the installation bore during the insertion of the installation sleeve into the installation bore. The terms "front" and "rear" are used accordingly.

Between the second sleeve portion of the installation sleeve and the wall of the installation bore, an annular channel is present to enable all radial openings distributed over the circumference of the installation sleeve to be used for the flow of pressurizing medium. A channel, which extends in the hydraulic block and is part of a fluid path leading to a hydraulic consumer, starts from the annular channel.

The ratio between the first external sealing diameter and the guide diameter is preferably in the range between 1.12 and 1.27, in particular in the range between 1.12 and 1.25.

If the directional cartridge valve is a seat valve, the control slide cooperates via a seat control edge with an internal step located on the installation sleeve in the internal bore in front of the radial openings, between these and the front end face, wherein the control slide is guided in the axial direction on a guide diameter of the installation sleeve, at least behind the radial openings, and the internal diameter of the installation sleeve, up to the region of the radial openings, is at least as large as the guide diameter. The ratio between the first external sealing diameter and the guide diameter is then preferably in the range between 1.10 and 1.22, in particular in the range between 1.12 and 1.20.

The internal diameter of the installation sleeve is preferably substantially constant from the front end face to the internal step, wherein the ratio between the first external sealing diameter and the internal diameter of the installation sleeve from the front end face to the internal step is in a range between 1.10 and 1.30, in particular in a range between 1.15 and 1.25. A large axial inflow channel and large axial outflow channel for the pressurizing fluid is thereby created within the installation sleeve.

The second sleeve portion of the installation sleeve advantageously has a constant external diameter, wherein the ratio between the constant external diameter of the second sleeve portion of the installation sleeve and the guide diameter is in the range between 1.15 and 1.35, in particular between 1.20 and 1.30.

It is advantageous if the internal step on the installation sleeve only has a very small width, since the flow is then only slightly diverted and a large inflow and outflow cross-section for the pressurizing fluid is available. In this case, the width of the internal step is understood to be half the difference between the guide diameter and the internal diameter of the installation sleeve at the inner edge of the internal step. The internal step preferably has a width in a range between 0.8 mm and 1.7 mm, in particular in a range between 1 mm and 1.5 mm. In particular the width of the internal step is 1 mm or 1.5 mm. The value depends primarily on the nominal size of the directional cartridge valve according to the disclosure. For example, it can be 1 mm for the small nominal sizes NS32, NS40, NS50 and 1.5 mm for the large nominal sizes NS63, NS80 and NS100.

To keep the risk of a crack or fracture at the transition between the first sleeve portion and the second sleeve portion of the installation sleeve low, a circumferential, rounded relief notch can be present externally at the transition from the first sleeve portion into the second sleeve portion, in which relief notch the external diameter of the installation sleeve is smaller than the first external sealing diameter.

It is advantageous for the flow of pressurizing fluid if the installation sleeve has a circumferential groove internally in the region of the radial openings. The depth of the circumferential groove is preferably 2 mm.

The control slide expediently has an axial bore, which lies in a fluid path between the two end faces of the control slide, wherein the axial bore has, over a certain length from the front end face of the control slide, which is located in the region of the internal step of the installation sleeve, a first diameter and, adjoining this, a second smaller diameter, and wherein the transition between the larger diameter and the smaller diameter, as seen from the front end face, is located at a spacing behind the seat control edge. The axial bore in the control slide serves primarily to connect the axial connection of the directional cartridge valve to a space in front of the rear end face of the control slide and to thus establish substantial pressure compensation at the control slide, although it also reduces the weight of the control slide in comparison with a solid control slide so that the control slide responds more quickly to a control. As a result of the large diameter of the axial bore from the front end face of the control slide, the surface on the control slide which is exposed to the flow forces is reduced.

A chamfer, preferably a 30 degree chamfer, is advantageously located on the edge between the axial bore of the control slide and the front end face of the control slide. The end face of the control slide is thereby further reduced. The flow forces become smaller.

For effective sealing of the rear region of the valve with respect to the working connections, the control slide can have an annular groove which extends externally around its circumference and in which a sealing ring is located, wherein the position of the annular groove on the control slide is such that the annular groove, as seen axially, is located in the region of the second sleeve portion when the control side is seated on the internal step of the installation sleeve. The transition between the larger diameter and the smaller diameter of the axial bore in the control slide is advantageously located at a spacing in front of the annular groove so that the control slide is not overly weakened in the region of the annular groove.

The spacing of the transition between the larger diameter and the smaller diameter of the axial bore in the control slide from the seat control edge is preferably approximately half as large as the spacing of the annular groove and the sealing ring from the seat control edge.

The annular groove and the sealing ring can be located in a guide region of the control slide, wherein the control slide has pressure-compensating channels on both sides of the annular groove.

The pilot-operated hydraulic directional valve according to the disclosure comprises, as known per se, a valve cover which is seated on the installation sleeve. In a manner which is likewise known per se, the control slide projects into the valve cover and the slide collar, together with the cover, separates two control chambers from one another. To actuate the control slide, pressurizing medium is supplied to the one control chamber via a pilot valve and pressurizing medium is discharged from the other control chamber.

BRIEF DESCRIPTION OF THE DRAWINGS

An exemplary embodiment of a pilot-operated hydraulic directional cartridge valve according to the disclosure is illustrated in the drawings. The disclosure is now explained in more detail with reference to the figures of these drawings, which show.

DETAILED DESCRIPTION

Figure 6:
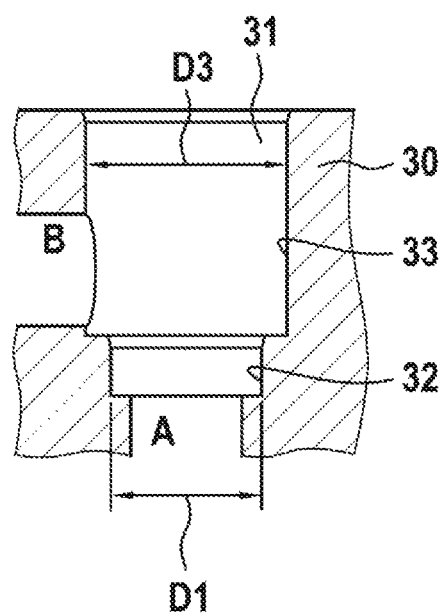

The pilot-operated hydraulic directional cartridge valve shown is a 2-way cartridge valve and comprises a main valve 10, a pilot valve 11, a travel sensor 12 and integrated electronics 13. The main valve 10 in turn has an installation sleeve 15 which has an internal bore 16 and is provided to be inserted, leading with its front end face 29, into an installation bore 31 of a hydraulic block 30, such as that illustrated in part in FIG. 6. The installation sleeve 15 is held on a cover 17 which is screwed to the hydraulic block during the assembly of the valve. The main valve furthermore has a control slide 18, which is axially movably guided in the installation sleeve 15 and projects into a bore 19 of the cover 17. Although the bore 19 has several widened portions, it is described here as a bore. It is stepped, wherein, starting from a front side 20 facing the installation bore, it has a first portion 21 having a larger diameter, followed by a portion 22 having a smaller diameter and finally a portion 24 which is open at the rear side 23 and has the smallest diameter.

A sealing plug 25 is inserted into the portion 24, through which sealing plug a core rod 26 of the travel sensor 12 is guided into a housing of the travel sensor 12 in a sealed manner, which core rod is fixedly connected to the control slide 17.

The installation bore 31 has two bore portions 32 and 33, the diameters D1 and D3 of which are specified by the standard mentioned. A fluid channel A leads axially into the bore portion 32, a fluid channel B leads radially into the bore portion 33, which is substantially longer than the bore portion 32 and whereof the diameter D3 is larger than the diameter D1 of the bore portion 32. Accordingly, the installation sleeve 15 has, at the front, a first sleeve portion 34 having a first external sealing diameter which is equal to the diameter D1. Within the sleeve portion 34, the installation sleeve 15 has a circumferential groove 35 into which a sealing ring 36 is inserted or is to be inserted. During the installation of the installation sleeve 15 in the installation bore, the first sleeve portion 34 arrives in the bore portion 32 and seals the two working connections A and B with respect to one another at the outer side of the installation sleeve.

The installation sleeve 15 furthermore possesses, at the rear, a third sleeve portion 42, whereof the second external sealing diameter is equal to the diameter D3 of the bore portion 33. Within the sleeve portion 42, the installation sleeve 15 has a circumferential annular groove 38, into which a sealing ring 39 is inserted or is to be inserted. During the installation of the installation sleeve 15 in the installation bore, the third sleeve portion 42 arrives in the bore portion 33 and seals the installation bore 31 towards the cover 17 on the outer side of the installation sleeve 15.

Figure 1:
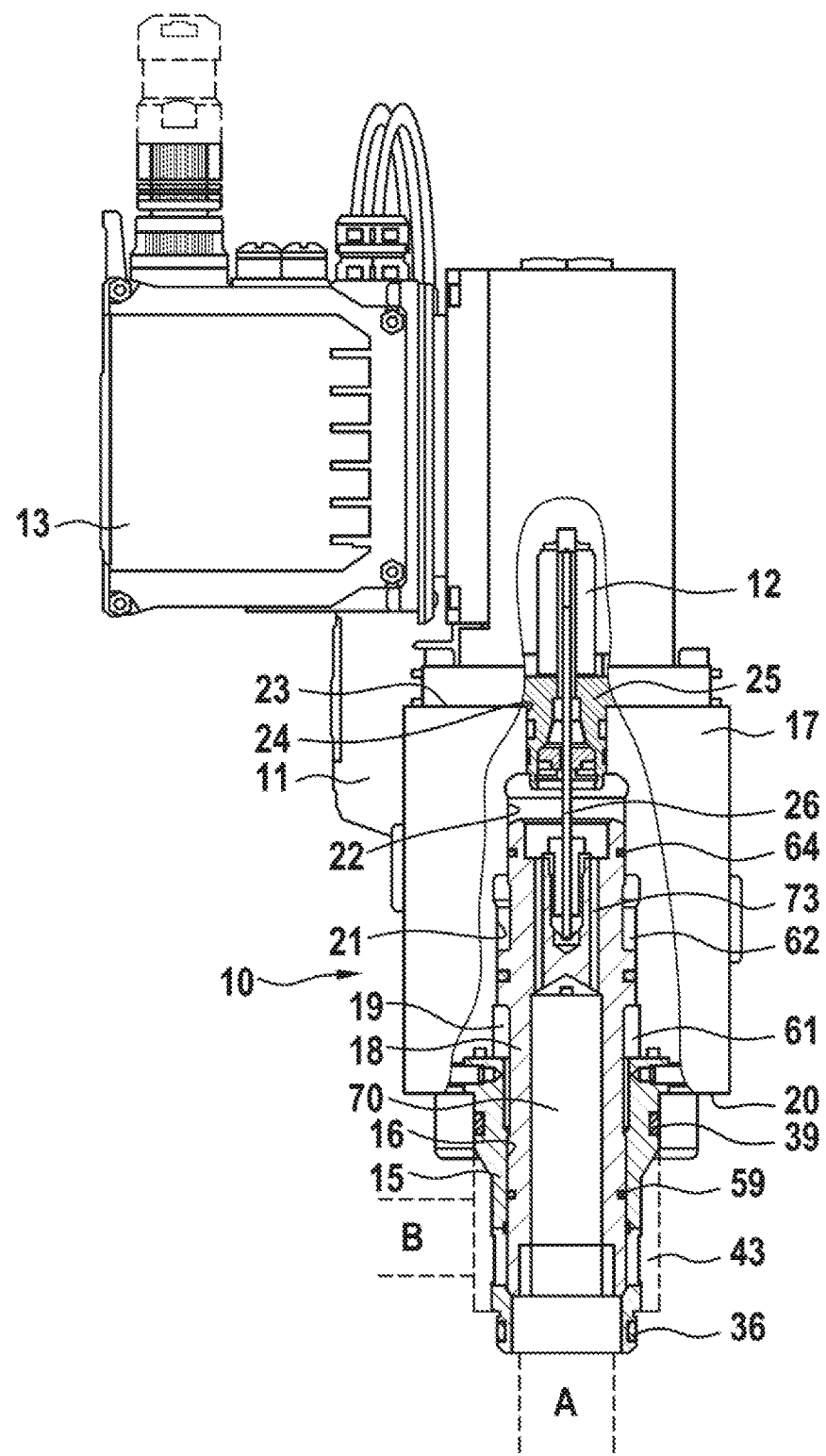
FIG. 1 the entire cartridge valve, partially in a plan view, partially in section, FIG. 2 an external view of just the installation sleeve on a larger scale than the view according to FIG. 1, FIG. 3 the installation sleeve according to FIG. 2 in a longitudinal section, FIG. 4 an external view of just the control slide on a larger scale than the view according to FIG. 1, FIG. 5 the control slide according to FIG. 4 in a longitudinal section, and FIG. 6 an installation bore according to DIN ISO 7368.

The third sleeve portion 42 is substantially shorter than the bore portion 33. Between the first sleeve portion 34 and the third sleeve portion 42, the installation sleeve 15 has a second sleeve portion 37 which, after installation, is likewise located in the region of the bore portion 33 although its constant external diameter D2 is smaller than the diameter D3 of the bore portion 33 so that an annular channel 43, indicated in FIG. 1, is formed around the sleeve portion 37. The sleeve portion 37 merges externally into a cone in the third sleeve portion 37.

The external diameter D2 of the second sleeve portion 37 is larger than the first sealing diameter D1 of the first sleeve portion 34. A circumferential, rounded relief notch 44 is present externally at the transition from the first sleeve portion 34 into the second sleeve portion 37, in the lowest point of which relief notch the external diameter of the installation sleeve 15 is smaller than the first external diameter D1.

Figure 2:
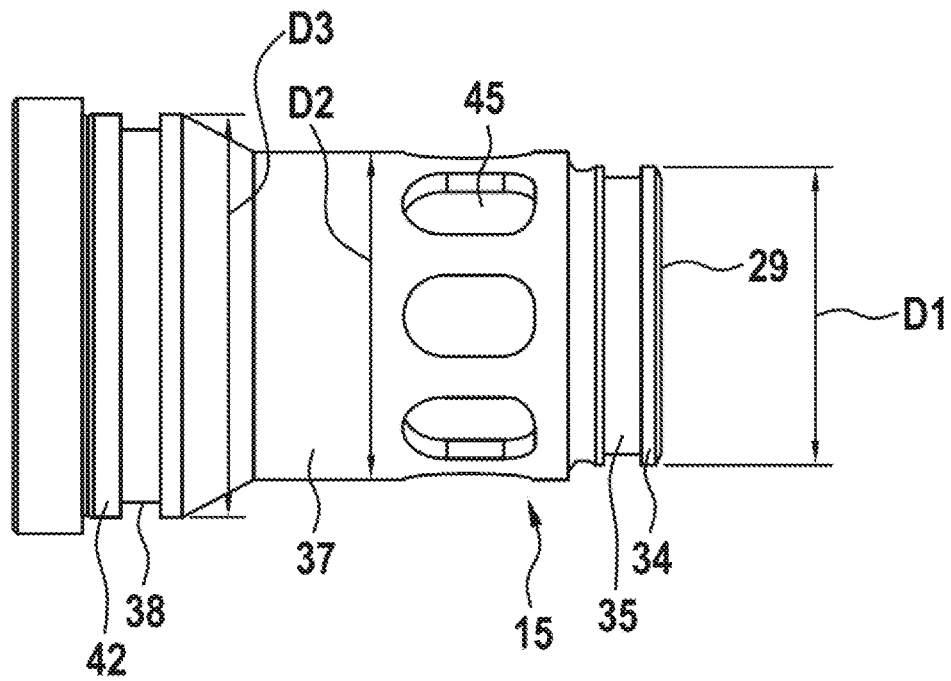
Figure 3:
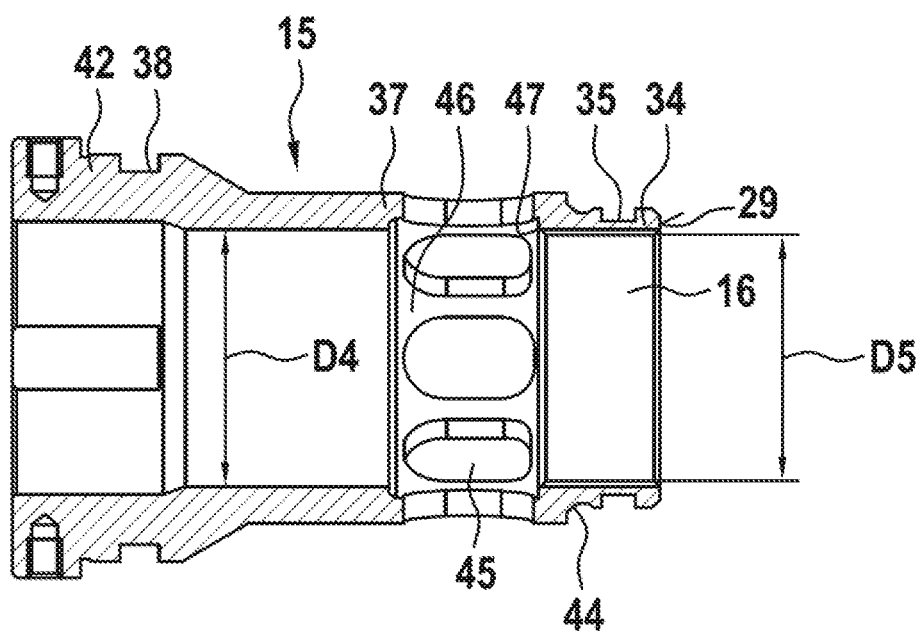
Figure 4:
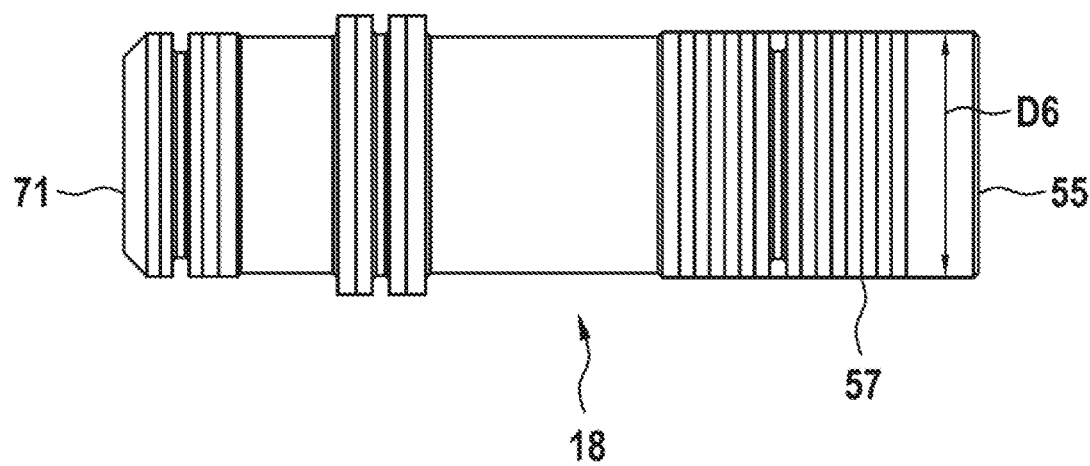
Figure 5:
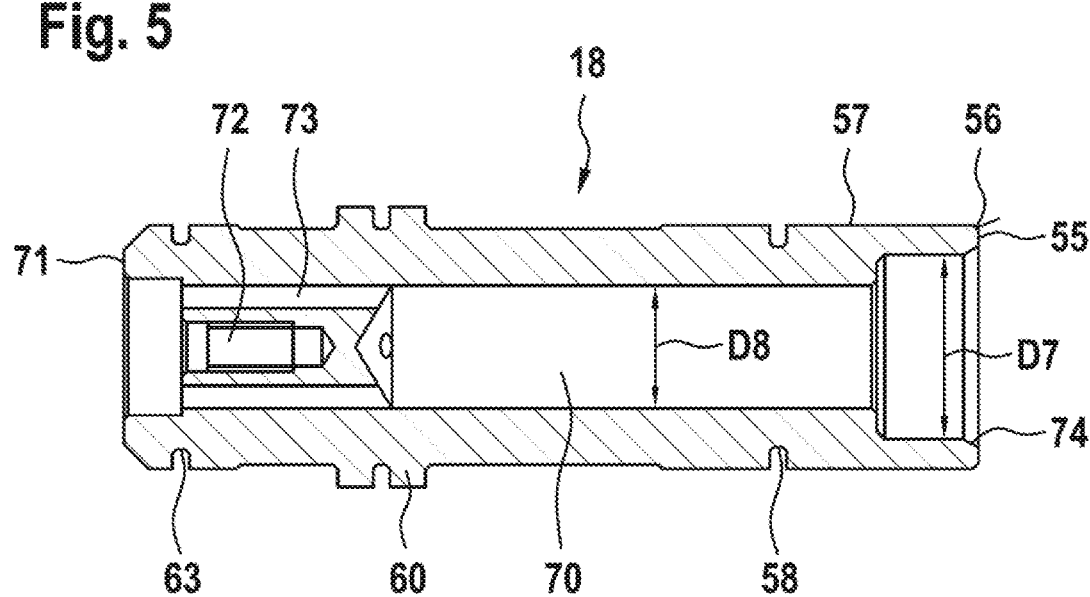

At a slight spacing from the first sleeve portion 34, a plurality of radial openings 45, which are elongated in the axial direction of the installation sleeve 15 and are uniformly distributed over the circumference of the installation sleeve 15, are located at the same level in the second sleeve portion 37, via which openings a fluidic connection between the annular channel 43 and the part of the internal bore 16 which is located in front of the openings 45, and therefore between the two working connections A and B, is possible. In the region of the radial openings 45, the installation sleeve 15 has a circumferential groove 46 internally, the depth of which is approximately 2 mm. Adjoining the groove 46, the installation sleeve 15 has internally, in the region of the second sleeve portion 37 and the conical external transition from the second sleeve portion 37 to the third sleeve portion 42, a guide diameter D4 on which the control slide 18 is guided in the installation sleeve 15 and which is smaller than the first sealing diameter D1 of the first sleeve portion 34. The ratio between the first sealing diameter D1 and the guide diameter D4 is in the range between 1.10 and 1.28. In FIGS. 2 and 3, the installation sleeve 15 of a directional cartridge valve having a nominal size 40 is shown, in which the first sealing diameter D1 is equal to 55 mm. The guide diameter D4 in the present case is 48 mm, so that, in the exemplary embodiment, the ratio between the first sealing diameter D1 and the guide diameter D4 is equal to 1.146, i.e. in the range between 1.10 and 1.28, in particular in the range between 1.12 and 1.20. The ratio can be different for other nominal sizes. Likewise, the ratio can depend on whether the directional cartridge valve is a 2-way cartridge valve of a seat-type design or a 2-way cartridge valve or 3-way cartridge valve of a purely slide-type design without a seat for the control slide.

Adjoining the region having the guide diameter D4 to the rear, the internal diameter of the installation sleeve 15 is slightly larger than the guide diameter D4.

The external diameter of the second sleeve portion 37 is kept as small as possible so that the width of the annular channel 43 is large. In the present case, the external diameter of the second sleeve portion 37 is 61 mm. Therefore the ratio of the external diameter to the internal diameter of the installation sleeve in the region of the second sleeve portion 37 is equal to 1.27. This value is within a range between 1.15 and 1.35 and in particular between 1.20 and 1.30. It can have a different size for other nominal sizes and other designs.

The installation sleeve 15 shown in FIGS. 2 and 3 is formed in a seat-type design. To this end, its internal diameter in front of the radial openings 45 merges into a conical internal step 47 on a smaller internal diameter D5 of the first sleeve portion 34. Apart from a small chamfer on the front end face 29, this internal diameter D5 is constant up to this end face, i.e. also in the region of the first sleeve portion 34. It is as large as possible and is equal to 46 mm in the present case. The ratio between the first sealing diameter D1 on the first sleeve portion 34 and the internal diameter D5 is therefore 1.196 and is therefore in a range between 1.10 and 1.30, in particular in the range between 1.15 and 1.25. The width of the internal step 47, which is the result of the difference between the guide diameter D4, which is equal to 48 mm, and the internal diameter D5, is therefore 1 mm and is therefore in a range between 0.8 and 1.7 mm. The width of the internal step can also be 1.5 mm for larger nominal sizes, for example from nominal size 63.

Starting from a front end face 55 having a seat control edge 56, with which it can be seated on the conical internal step 47 of the installation sleeve 15, the control slide 18 has, over a certain length, a guide diameter D6 which is equal to the guide diameter D4 of the installation sleeve 15, wherein the tolerances are selected such that the control slide is prevented from jamming in the internal bore 16. The length corresponds approximately to the spacing between the internal step 47 and the point at which the diameter of the internal bore 16 merges from the guide diameter D4 into the somewhat larger internal diameter in the region of the third sleeve portion 42. In the region of the control slide in which this is guided on the guide diameter D4 of the installation sleeve, pressure-compensating channels 57 are located externally on the control slide 18. Approximately in the center of this region, a circumferential annular groove 58, into which a sealing ring 59 is inserted or is to be inserted, is cut into the control slide 18. The bore 19 in the cover 17 is thereby sealed in an effective manner internally towards the working connections A and B. When the control slide 18 is seated on the internal step 47 of the installation sleeve 15, the annular groove 58 and therefore also the sealing ring 59 are located in the region of the second sleeve portion 37.

The control slide 18 has, within the bore portion 21 which is located in the cover 17 and whereof the diameter is larger than the guide diameters D4 and D6, a slide collar 60 via which two mutually separate control chambers 61 and 62 are formed in the bore portion 21, one of which control chambers is fluidically connected via fluid paths in the cover 17 to a first connection and the other of which is fluidically connected to a second connection of the pilot valve 11. If the pilot valve is controlled such that hydraulic oil is supplied to the control chamber 61 and discharged from the control chamber 62, the control slide 18 moves in such a way that a flow cross-section between the two working connections A and B is opened or increased. On the other hand, if the pilot valve is controlled such that hydraulic oil is supplied to the control chamber 62 and discharged from the control chamber 61, the control slide 18 moves in such a way that a flow cross-section between the two working connections A and B is reduced or closed.

The control slide 18 projects beyond the bore portion 21 into the bore portion 22 of the bore 19 in the cover 17. The diameter of the bore portion 22 is equal to the guide diameters D4 on the installation sleeve 15 and control slide 18. The space in the cover 17 behind the control slide 18 is sealed in an effective manner with respect to the control chamber 62 by a sealing ring 64 inserted into an annular groove 63 of the control slide 18.

A central axial bore 70 of a limited length is incorporated in the control slide 18 from its end face 55, the diameter of which axial bore, whilst taking the strength of the control slide into consideration, is as large as possible to realize a control slide with a low weight. A blind bore 72, which serves for fastening the core rod 26 of the travel sensor 12 on the control slide 18, is incorporated from the rear end face in the material remaining between the blind bore 70 and the rear end face 71. An open fluidic connection between the spaces in front of the two end faces 55 and 71 of the control slide 18 is created by a plurality of eccentrically situated small bores 73 in the remaining material and by the axial bore 70. The control slide 18 is therefore substantially pressure-compensated.

From the front end face 55 of the control slide 18, the axial bore 70 firstly has, over a certain length, a first diameter D7 and, adjoining this, a second, smaller diameter D8. The point of the transition between the larger diameter D7 and the smaller diameter D8 in the axial direction is such that, during operation, as seen from the front end face 55, it can also be located behind the radial openings 45 depending on the length of the stroke of the control slide 18. The portion of the axial bore 70 which has the larger diameter D7 is also relatively long. In any case, this portion terminates at a spacing in front of the annular groove 58 so that the control slide 18 is still sufficiently stable in the region of the annular groove. In the exemplary embodiment shown, the spacing of the point of the transition between the two diameters from the seat control edge 56 of the control slide 18 is approximately half as large as the spacing of the annular groove 58 from the seat control edge. Since the control slide 18 shown does not have a fine-control region located in front of the seat control edge, i.e. the seat control edge is formed at the front end face, the above statement also applies to the spacings from the front end face 55.

In the portion of the axial bore which has the larger diameter D7, the ratio between the external diameter of the control slide and the diameter D7 is equal to 1.33. The flow forces acting on the control slide 18 are low as a result of the large diameter D7 of the axial bore 70 in the region of the end face 55.

A chamfer 74, which encloses an angle of 30 degrees with the axis of the control slide 18, is located at the edge between the axial bore 70 and the front end face 55 of the control slide. The end face is thus further reduced. The flow forces become even lower.

LIST OF REFERENCE SIGNS

10 Main valve
11 Pilot valve
12 Travel sensor
13 Integrated electronics
15 Installation sleeve
16 Internal bore of 15
17 Cover
18 Control slide
19 Bore in 17
20 Front side of 17
21 Portion of 19
22 Portion of 19
23 Rear side of 17
24 Portion of 19
25 Sealing plug
26 Core rod of 12
29 Front end face of 15
30 Hydraulic block
31 Installation bore
32 Bore portion of 31
33 Bore portion of 31
34 First sleeve portion of 15
35 Annular groove in 34
36 Sealing ring
37 Second sleeve portion of 15
38 Annular groove in 42
39 Sealing ring
42 Third sleeve portion
43 Annular channel
44 Relief notch
45 Radial openings
46 Circumferential groove
47 Internal step in 15
55 Front end face of 18
56 Seat control edge of 18
57 Pressure-compensating channels in 18
58 Annular groove in 18
59 Sealing ring in 58
60 Slide collar
61 Control chamber
62 Control chamber
63 Annular groove in 18
64 Sealing ring in 63
70 Axial bore in 18
71 Rear end face of 18
72 Blind bore
73 Bores in 18
74 Chamfer on 18
A Working connection
B Working connection
D1 Diameter of 32 and sealing diameter of 34
D2 External diameter of 37
D3 Diameter of 33 and sealing diameter of 42
D4 Guide diameter of 37
D5 Internal diameter of 34
D6 External diameter, guide diameter of 18
D7 First, larger diameter of 70
D8 Second, smaller diameter of 70

What is claimed is:

1. A pilot-operated hydraulic directional cartridge valve, comprising:
an installation sleeve configured to be inserted into an installation bore of a hydraulic block and including:
an internal bore;
a first sleeve portion positioned towards a first front end face of the installation sleeve, the first sleeve portion having a first external sealing diameter;
a third sleeve portion positioned towards a first rear end face of the installation sleeve, the third sleeve portion having a second external sealing diameter that is larger than the first external sealing diameter; and
a second sleeve portion between the first sleeve portion and the third sleeve portion defining a row of radial openings, the second sleeve portion having a first external diameter in a region of the row of radial openings and over a first length on both sides of the region, the first external diameter being larger than the first external sealing diameter and smaller than the second external sealing diameter;

a control slide including a slide collar acted on by pressure so as to hydraulically actuate the control slide, the control slide guided in an axial direction in the internal bore of the installation sleeve, and configured to control a flow cross-section between the internal bore and the row of radial openings of the installation sleeve so as to disable or enable flow between the internal bore and the row of radial openings; and a valve cover seated on the installation sleeve, the control slide projecting into the valve cover, wherein the control slide is guided on a guide diameter of the installation sleeve, at least behind the row of radial openings, wherein a first internal diameter of the installation sleeve, from the first rear end face up to the region of the row of radial openings, is at least as large as the guide diameter, wherein a ratio of the first external sealing diameter to the guide diameter for the control slide is in a range between 1.10 and 1.28, wherein the slide collar, together with the valve cover, separates a first control chamber and a second control chamber from one another, and wherein, to actuate the control slide, pressurizing medium is supplied to the first control chamber via a pilot valve and pressurizing medium is discharged from the second control chamber.

2. The pilot-operated hydraulic directional cartridge valve according to claim 1, wherein the ratio of the first external sealing diameter to the guide diameter is in a range between 1.12 and 1.27.

3. The pilot-operated hydraulic directional cartridge valve according to claim 1, wherein:
the control slide is configured to cooperate with an internal step located on the installation sleeve in the internal bore via a seat control edge, the internal step located in front of the row of radial openings, between the row of radial openings and the first front end face; and
the ratio of the first external sealing diameter to the guide diameter is in a range between 1.10 and 1.22.

4. The pilot-operated hydraulic directional cartridge valve according to claim 3, wherein the ratio of the first external sealing diameter to the guide diameter is in a range between 1.12 and 1.20.

5. The pilot-operated hydraulic directional cartridge valve according to claim 3, wherein:
a second internal diameter of the installation sleeve is substantially constant from the first front end face to the internal step; and
a ratio of the first external sealing diameter to the second internal diameter of the installation sleeve is in a range between 1.10 and 1.30.

6. The pilot-operated hydraulic directional cartridge valve according to claim 5, wherein:
the ratio of the first external sealing diameter to the second internal diameter of the installation sleeve is in a range between 1.15 and 1.25.

7. The pilot-operated hydraulic directional cartridge valve according to claim 3, wherein the internal step on the installation sleeve has a width in a range between 0.8 mm and 1.7 mm.

8. The pilot-operated hydraulic directional cartridge valve according to claim 7, wherein the width is in a range between 1 mm and 1.5 mm.

9. The pilot-operated hydraulic directional cartridge valve according to claim 3, wherein:

the control slide has an annular groove extending externally around a circumference of the control slide configured to receive a sealing ring; and
the annular groove is arranged such that the annular groove, as viewed axially, is located in a region of the second sleeve portion when the control side is seated on the internal step of the installation sleeve.

10. The pilot-operated hydraulic directional cartridge valve according to claim 9, wherein:
the annular groove is located in a guide region of the control slide; and
the control slide has pressure-compensating channels on both sides of the annular groove.

11. The pilot-operated hydraulic directional cartridge valve according to claim 1, wherein:
the first external diameter of the second sleeve portion is constant; and
a ratio of the first external diameter of the second sleeve portion to the guide diameter is in a range between 1.15 and 1.35.

12. The pilot-operated hydraulic directional cartridge valve according to claim 11, wherein:
the ratio of the external diameter of the second sleeve portion to the guide diameter is in a range between 1.20 and 1.30.

13. The pilot-operated hydraulic directional cartridge valve according to claim 1, further comprising:
a circumferentially rounded relief notch arranged externally at a first transition from the first sleeve portion to the second sleeve portion,
wherein a second external diameter of the installation sleeve in the relief notch is smaller than the first external sealing diameter.

14. The pilot-operated hydraulic directional cartridge valve according to claim 1, wherein the ratio of the first external sealing diameter to the guide diameter is in a range between 1.12 and 1.25.

15. A pilot-operated hydraulic directional cartridge valve, comprising:
an installation sleeve configured to be inserted into an installation bore of a hydraulic block and including:
an internal bore;
a first sleeve portion positioned towards a first front end face of the installation sleeve, the first sleeve portion having a first external sealing diameter;
a third sleeve portion positioned towards a first rear end face of the installation sleeve, the third sleeve portion having a second external sealing diameter that is larger than the first external sealing diameter; and
a second sleeve portion between the first sleeve portion and the third sleeve portion defining a row of radial openings, the second sleeve portion having a first external diameter in a region of the row of radial openings and over a first length on both sides of the region, the first external diameter being larger than the first external sealing diameter and smaller than the second external sealing diameter; and
a control slide including a slide collar acted on by pressure so as to hydraulically actuate the control slide, the control slide guided in an axial direction in the internal bore of the installation sleeve, and configured to control a flow cross-section between the internal bore and the row of radial openings of the installation sleeve so as to disable or enable flow between the internal bore and the row of radial openings, wherein:

the control slide is guided on a guide diameter of the installation sleeve, at least behind the row of radial openings;

a first internal diameter of the installation sleeve, from the first rear end face up to the region of the row of radial openings, is at least as large as the guide diameter;

a ratio of the first external sealing diameter to the guide diameter for the control slide is in a range between 1.10 and 1.28;

the installation sleeve has a circumferential groove internally in the region of the row of radial openings; and a depth of the circumferential groove is approximately 2 mm.

16. The pilot-operated hydraulic directional cartridge valve according to claim 15, further comprising:

a valve cover seated on the installation sleeve, the control slide projecting into the valve cover, wherein the slide collar, together with the valve cover, separates a first control chamber and a second control chamber from one another, and wherein, to actuate the control slide, pressurizing medium is supplied to the first control chamber via a pilot valve and pressurizing medium is discharged from the second control chamber.

17. A pilot-operated hydraulic directional cartridge valve, comprising:

an installation sleeve configured to be inserted into an installation bore of a hydraulic block and including:
an internal bore;
a first sleeve portion positioned towards a first front end face of the installation sleeve, the first sleeve portion having a first external sealing diameter;
a third sleeve portion positioned towards a first rear end face of the installation sleeve, the third sleeve portion having a second external sealing diameter that is larger than the first external sealing diameter; and
a second sleeve portion between the first sleeve portion and the third sleeve portion defining a row of radial openings, the second sleeve portion having a first external diameter in a region of the row of radial openings and over a first length on both sides of the region, the first external diameter being larger than the first external sealing diameter and smaller than the second external sealing diameter; and a control slide including a slide collar acted on by pressure so as to hydraulically actuate the control slide, the control slide guided in an axial direction in the internal bore of the installation sleeve, and configured to control a flow cross-section between the internal bore and the row of radial openings of the installation sleeve so as to disable or enable flow between the internal bore and the row of radial openings, wherein:

the control slide is guided on a guide diameter of the installation sleeve, at least behind the row of radial openings;

a first internal diameter of the installation sleeve, from the first rear end face up to the region of the row of radial openings, is at least as large as the guide diameter;

a ratio of the first external sealing diameter to the guide diameter for the control slide is in a range between 1.10 and 1.22;

the control slide is configured to cooperate with an internal step located on the installation sleeve in the internal bore via a seat control edge, the internal step located in front of the row of radial openings, between the row of radial openings and the first front end face;

the control slide includes an axial bore lying in a fluid path between a second front end face and a second rear end face of the control slide, the second front end face located in the region of the internal step of the installation sleeve;

the axial bore has a first bore diameter over a certain length from the second front end face and a second bore diameter adjoining the first bore diameter, the second bore diameter smaller than the first bore diameter; and a second transition between the first bore diameter and the second bore diameter on the control slide is arranged such that, in operation, as viewed from the second front end face (55), the second transition is also located behind the row of radial openings depending on a stroke length of a stroke of the control slide.

18. The pilot-operated hydraulic directional cartridge valve according to claim 17, further comprising:

a chamfer is located on an edge between the axial bore and the second front end face of the control slide.

19. The pilot-operated hydraulic directional cartridge valve according to claim 17, wherein:

the control slide has an annular groove extending externally around a circumference of the control slide configured to receive a sealing ring;

the annular groove is arranged such that the annular groove, as viewed axially, is located in a region of the second sleeve portion when the control side is seated on the internal step of the installation sleeve; and the second transition between the first bore diameter and the second bore diameter of the axial bore in the control slide is located at a first spacing from the annular groove.

20. The pilot-operated hydraulic directional cartridge valve according to claim 19, wherein a second spacing of the second transition and the seat control edge of the control slide is approximately half as large as a third spacing between the annular groove and the seat control edge.

* * * * *

UNITED STATES PATENT AND TRADEMARK OFFICE
CERTIFICATE OF CORRECTION

PATENT NO. : 11,125,351 B2  
APPLICATION NO. : 16/443224  
DATED : September 21, 2021  
INVENTOR(S) : Reith et al.

Page 1 of 1

It is certified that error appears in the above-identified patent and that said Letters Patent is hereby corrected as shown below:

In the Specification

At Column 3, Lines 48-49: "the control side" should read --the control slide--.

In the Claims

In Claim 9, at Column 10, Line 6: "the control side" should read --the control slide--.

In Claim 17, at Column 12, Line 27: "end face (55)," should read --end face,--.

In Claim 19, at Column 12, Line 41: "the control side" should read --the control slide--.

Signed and Sealed this  
Fifth Day of April, 2022

Drew Hirshfeld  
*Performing the Functions and Duties of the*  
*Under Secretary of Commerce for Intellectual Property and*  
*Director of the United States Patent and Trademark Office*